United States Patent
Brown

(10) Patent No.: US 10,724,618 B2
(45) Date of Patent: Jul. 28, 2020

(54) ELECTRIC DRIVE AXLE SYSTEM

(71) Applicant: Deere & Company, Moline, IL (US)

(72) Inventor: Daryl T. Brown, Neodesha, KS (US)

(73) Assignee: Deere & Company, Moline, IL (US)

( * ) Notice: Subject to any disclaimer, the term of this patent is extended or adjusted under 35 U.S.C. 154(b) by 124 days.

(21) Appl. No.: 15/927,906

(22) Filed: Mar. 21, 2018

(65) Prior Publication Data
US 2019/0293158 A1 Sep. 26, 2019

(51) Int. Cl.
| | |
|---|---|
| *B60K 1/00* | (2006.01) |
| *F16H 37/06* | (2006.01) |
| *F16H 1/28* | (2006.01) |
| *B60K 17/04* | (2006.01) |
| *B60K 7/00* | (2006.01) |
| *F16H 48/36* | (2012.01) |
| *F16H 48/20* | (2012.01) |
| *F16H 48/22* | (2006.01) |

(52) U.S. Cl.
CPC .......... *F16H 37/065* (2013.01); *B60K 1/00* (2013.01); *B60K 7/0007* (2013.01); *B60K 17/046* (2013.01); *F16H 1/28* (2013.01); *B60K 2001/001* (2013.01); *B60K 2007/0038* (2013.01); *B60K 2007/0092* (2013.01); *F16H 48/22* (2013.01); *F16H 2048/201* (2013.01); *F16H 2048/366* (2013.01)

(58) Field of Classification Search
CPC .. F16H 37/065; F16H 2048/201; F16H 48/22; F16H 2048/366; B60K 7/0007; B60K 17/046; B60K 2007/0038; B60K 2007/0092; B60K 2001/001

USPC ......... 475/149, 150, 154, 205, 219; 180/372
See application file for complete search history.

(56) References Cited

U.S. PATENT DOCUMENTS

| | | | |
|---|---|---|---|
| 2,027,218 A | * | 1/1936 | Armington ............... B61C 9/38 105/100 |
| 2,989,599 A | | 6/1961 | Banker |
| 3,773,128 A | | 11/1973 | Bowen et al. |
| 4,368,650 A | | 1/1983 | Numazawa et al. |
| 4,433,594 A | | 2/1984 | Smirl |
| 4,611,505 A | | 9/1986 | Cronin et al. |

(Continued)

FOREIGN PATENT DOCUMENTS

GB 2123102 A 1/1984

OTHER PUBLICATIONS

Borg Warner, Torque Vectoring Electric Drive Module YouTube Video, https://www.youtube.com/watch?v=0DqPmACleKA, Nov. 22, 2013.

(Continued)

*Primary Examiner* — Roger L Pang
(74) *Attorney, Agent, or Firm* — Klintworth & Rozenblat IP LLP

(57) ABSTRACT

An electric drive axle system has an integral electric machine. An axle system includes a pair of output shafts and a motor with a rotor shaft disposed in line with the output shafts. A gearset is coupled between the rotor shaft and one output shaft. Another gearset is coupled between the rotor shaft and the other output shaft. Each gearset has a sun gear meshing with a set of planet gears supported on a carrier. The rotor shaft is fixed to the sun gears and the output shafts are fixed to the carriers. A clutch may alternately prevent or allow rotation of ring gears of the gearsets.

18 Claims, 4 Drawing Sheets

(56) References Cited

U.S. PATENT DOCUMENTS

| | | | |
|---|---|---|---|
| 5,465,819 A | | 11/1995 | Weilant et al. |
| 6,325,736 B1 * | | 12/2001 | Hamada .................. B60K 1/00 |
| | | | 475/18 |
| 6,592,485 B2 | | 7/2003 | Otten et al. |
| 6,758,290 B2 | | 7/2004 | Jolliff et al. |
| 7,074,151 B2 * | | 7/2006 | Thompson ........... B60K 7/0007 |
| | | | 180/6.28 |
| 8,343,000 B2 * | | 1/2013 | Karlsson ................ B60L 15/20 |
| | | | 180/65.6 |
| 8,944,950 B2 * | | 2/2015 | Holmes ............... B60W 30/045 |
| | | | 475/150 |
| 9,071,087 B2 * | | 6/2015 | Karlsson ............. B60K 7/0007 |
| 9,194,473 B1 | | 11/2015 | Hauser et al. |
| 9,334,940 B2 | | 5/2016 | Neumann |
| 9,488,263 B2 | | 11/2016 | Vasudeva et al. |
| 9,709,148 B1 | | 7/2017 | Chu |
| 2002/0022544 A1 | | 2/2002 | Brooks |
| 2007/0048150 A1 | | 3/2007 | Welschof |
| 2010/0081544 A1 | | 4/2010 | Warner |
| 2016/0003336 A1 | | 1/2016 | Crosby et al. |
| 2016/0039277 A1 | | 2/2016 | Falls et al. |
| 2017/0146108 A1 | | 5/2017 | Valente et al. |

OTHER PUBLICATIONS

Auto Evolution, More Electric Axles on the Way—A Look at the Tech Your Next Car Might Have, Mar. 24, 2016.

Deere & Company, CAD Images of Steering and Torque System for Drive System with Steering Planetary Outboard of Differential Case, Admitted Prior Art.

Deere & Company, Drive System Image, Admitted Prior Art.

\* cited by examiner

ELECTRIC DRIVE AXLE SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to axle systems, and to electric drive arrangements for axle system applications with integrated transmission and differential functions.

BACKGROUND OF THE DISCLOSURE

Work vehicles, such as those used in the agriculture, construction and forestry industries, and other vehicles, equipment and machinery, may be driven by a power plant which includes an internal combustion engine or an alternative power source. Power is transferred to the drive wheels through a drivetrain that typically includes a drive shaft, a transmission to provide various gear ratios, and a differential to split power between the two sides of the vehicle. The power source, the transmission and the differential are typically packaged separately, and may be spread out along the length of the vehicle. This type of a separate package arrangement may be carried over when an alternative power source is used. Alternatively, with alternative power sources, electric motors may be located at each corner of the vehicle that includes a drive wheel, which also spreads the drive system components out into separate packages. Doing so impacts the design and packaging of numerous other components of the vehicle, increasing cost and development time.

SUMMARY OF THE DISCLOSURE

The disclosure provides an electric drive axle system with an integrated motor. In one aspect, an axle system includes a pair of output shafts, where the motor has a rotor shaft disposed in line with the output shafts. A gearset is coupled between the rotor shaft and one output shaft. Another gearset is coupled between the rotor shaft and the other output shaft. Each gearset has a sun gear meshing with a set of planet gears supported on a carrier. The rotor shaft is fixed to the sun gears and the output shafts are fixed to the carriers.

In another aspect, an axle includes a pair of output shafts for driving a pair of wheels. A motor drives the output shafts. A gearset is coupled between the rotor shaft and one output shaft. Another gearset is coupled between the rotor shaft and the other output shaft. Each gearset has a sun gear meshing with a set of planet gears supported on a carrier. The rotor shaft is fixed to the sun gears and the output shafts are fixed to the carriers.

In an additional aspect, an axle system includes a pair of output shafts for driving a pair of wheels. A motor with a rotor shaft is disposed in line with the output shafts. A planetary gearset is coupled between the rotor shaft and one output shaft. Another planetary gearset is coupled between the rotor shaft and the other output shaft. Each planetary gearset has a sun gear meshing with a set of planet gears that are supported on a carrier and that mesh with a ring gear. The rotor shaft is fixed to both sun gears, and one output shaft is fixed to each carrier. An idler gear meshes with one ring gear and a differential gear meshes with the idler gear. Another differential gear meshes directly with the other ring gear. A differential shaft is fixed to the differential gears. A clutch is connected with the differential shaft, and is alternately engaged to prevent the ring gears from turning requiring the first and second wheels to rotate at a common speed, or disengaged to release the ring gears to turn, enabling the wheels to rotate relative to one another.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
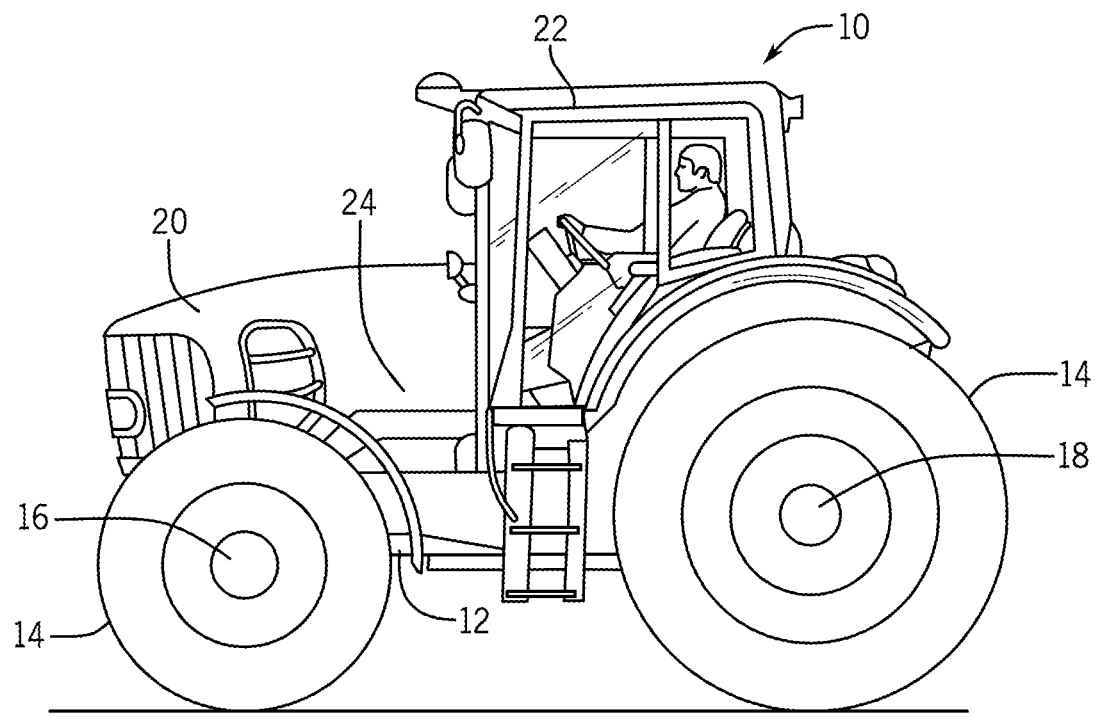
FIG. 1 is a side view of an example work vehicle in the form of an agricultural tractor in which the disclosed electric drive axle system may be used.

The following describes one or more example embodiments of a disclosed electric drive axle system, as shown in the accompanying figures of the drawings described briefly above. Various modifications to the example embodiments may be contemplated by one of skill in the art.

In one or more example implementations of the disclosed electric drive axle system, a single, integrated electric machine is packaged inside an axle house and provides drive torque for two wheels. The electric machine is coupled with a pair of output shafts for driving the two wheels, and is configured with integrated transmission and differential mechanisms. The system supports operation in a straight line and during turns. The system may be used to enhance traction by locking the wheels to turn at a common speed, and is adapted to motor braking, where the electric machine operates as a generator and which may be used for battery charging.

The following description relates to axle systems in the context of certain work vehicle related applications for purposes of demonstrating examples. With an electrically driven vehicle, the conversion of electrical energy into mechanical drive is effected for vehicle motion. With regard to the example work vehicle, this entails using the electric motor to rotate wheels that contact the ground to propel the vehicle. Propulsion of such a vehicle is complicated by a need to enable the wheels on opposite sides of the vehicle to travel different distances in relation to a given amount of revolution of the electric motor. This type of scenario is typically encountered when the vehicle is navigating through a turn and where a differential type function is needed. Propulsion is further complicated by a desire to provide torque multiplication where the motor's rotor rotates faster than the wheels on both sides of the vehicle, where a transmission function is needed.

In an example of the present disclosure as further described below, an electric machine is the power source that supplies power to two wheels. The electric machine has a rotor shaft disposed in line with the two output shafts that serve the two wheels. A pair of gearsets are included, with one coupled between the rotor shaft and each of the output shafts. The gearsets provide a transmission gear ratio type function. Each gearset is configured in a planetary arrangement and each has a sun gear meshing with a respective set of planet gears. The planet gear sets are each supported on a respective carrier. The rotor shaft is fixed to the two sun gears, and one of the output shafts is fixed to each one of the carrier. A ring gear is disposed around and engages each set of planet gears. A clutch is configured to alternately engage to fix the ring gears from turning or to disengage to release the ring gears to turn, providing a differential type function. Through this arrangement, the electric machine operates as a motor to provide traction power for the wheels, the gearsets provide torque multiplication, and the clutch enables one mode of operation where the wheels are driven at the same speed, and another mode of operation where the wheels are driven at different speeds.

As noted above, the electric drive axle system as described herein may be employed in a variety of applications. Referring to FIG. 1, one example application involves an electric drive axle system that may be included in a work vehicle 10, which in this example is depicted as an agricultural tractor. It will be understood, however, that other configurations are contemplated, including configurations with the work vehicle 10 as a different kind of tractor, or as a work vehicle used for other aspects of the agriculture industry, or for the construction or forestry industries (e.g., a harvester, a log skidder, motor grader, and so on). It will further be understood that the disclosed electric drive axle system may also be used in non-work vehicles, non-vehicle applications and with other types of equipment and machines where an integrated electric drive with outputs capable of operating at the same and at different speeds is useful.

In the current example, the work vehicle 10 has a main frame or chassis 12 supported by wheels 14 that engage the ground. The wheels 14 support the chassis 12 through axle assemblies 16, 18. Two or more of the wheels 14 may be powered for propelling the work vehicle 10, and in this example at least the front wheels 14 are steerable to control the direction of travel. In other examples, the vehicle 10 may be articulated or otherwise configured to provide a steering function. The chassis 12 supports a device that serves as a power plant for generating power, which in this example is in the form of an internal combustion engine referred to as an engine device 20. An operator cabin 22 is provided in which operator interface and control means (e.g., various controls wheels, levers, switches, buttons, screens, keyboards, etc.) are stationed. The work vehicle 10 may be configured to use and/or to provide to other connected equipment, power from the engine device 20 to generate electric power and/or to drive mechanical, fluid powered, and/or other functions. In the current example, one or both of the axle assemblies 16, 18 operates on electric power and the vehicle 10 includes a battery system 24 and supporting equipment for storing and delivering the power as further described below.

Figure 2:
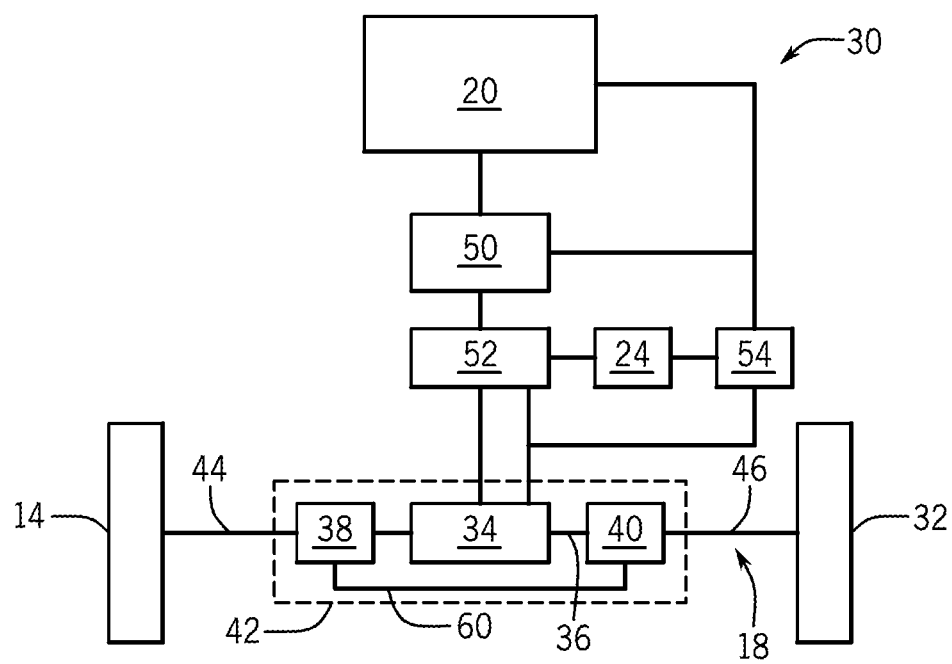
FIG. 2 is a block diagram of an electric drive axle system of the work vehicle of FIG. 1.

Referring to FIG. 2, the axle assembly 18, the engine device 20 and the battery system 24 of the vehicle 10 are configured in an electric drive axle system 30. The left wheel 14 and a right wheel 32 are connected with the axle assembly 18, which includes an integrated electric machine 34. The electric machine 34 has a rotor 36 coupled with left and right gearsets 38, 40, respectively, disposed within a center housing 42. Output shafts 44, 46 couple the gearsets 38, 40 with the wheels 14, 32, respectively. The output shafts 44, 46 provide output from the electric machine 34 and the gearsets 38, 40 to drive the wheels 14, 32. It should be understood that the output shafts 44, 46 may also operate to provide input from the wheels 14, 32 to the gearsets 38, 40 and the electric machine 34, for operation as a generator, such as for motor braking. In the current example, the electric drive axle system 30 may provide the desired reduction (e.g., 13:1), between the electric machine 34 and the wheels 14, 32 through single gearsets 38, 40. In other examples, final drive gearsets (further described below), may be provided at the wheels 14, 32 with the desired reduction provided in two incremental steps, through two gearsets on each side of the vehicle. In such an arrangement, mechanical wet friction brakes may be added to the input side of the final drive gearsets. For example, the desired reduction may be split between 6:1 at the gearsets 38, 40 and 7:1 at the final drive gearsets, which may be controlled to provide two speed ratios for operation of the vehicle 10 at low and high-speed ranges.

The electric drive axle system 30 also includes a generator 50 and power electronics 52. These components convert, condition, and control power from the mechanical motion of the engine device 20 to suitable electric power for storage in the battery system 24 and for use of the stored electric power by the electric machine 34. The power electronics 52 may also operate to convert energy generated by the electric machine 34 for storage in the battery system 24. The power electronics 52 may include rectifiers, inverters, converters, controls and other devices to provide the required conversion and control of electric power to support operation of the generator 50, the electric machine 34 and the battery system 24. A controller 54 is electrically coupled with the engine device 20, the generator 50, the power electronics 52, the battery system 24 and the electric machine 34 to provide control functions. The controller 54 may also be coupled with other devices necessary to provide the desired system control functions including various actuators and sensors such as wheel speed sensors (not shown). The controller 54 may include one or more computing devices such as various processor devices and various associated memory architectures. In certain embodiments, the controller 54 may additionally (or alternatively) include various other electronic control circuits and devices (e.g., various electronics devices or programmable circuits). The controller 54 may be disposed separately from other components (e.g., as shown in FIG. 2) or can be integrated into various components, such as the axle assembly 18. In some embodiments, the controller 54 may be dedicated solely to the functionality disclosed herein. In some embodiments, the controller 54 may be configured to provide other functionality of the vehicle 10 in addition to the control functions disclosed herein.

Generally, the controller 54, is used to provide at least some of the system operations and functions described herein. In operation, the electric drive axle system 30 as controlled by the controller 54 converts mechanical energy to electric power through the generator 50 as driven by the engine device 20. In this example, the generator 50 generates alternating current (AC) power that is converted to direct current (DC) power by the power electronics 52 for storage in the battery system 24. The power electronics 52 also convert/invert electric power from the generator 50 and/or the battery system 24 for use by the electric machine 34 to generate mechanical power to drive the wheels 14, 32 for motion of the vehicle 10.

In this example, the electric drive axle system 30 includes a differential shaft 60 coupling the gearsets 38, 40. For straight operating of the vehicle 10, the electric motor drives the gearsets 38, 40 providing output rotation to the output shafts 44, 46, which is delivered to the wheels 14, 32 with balanced torque loads and at a common rotational speed. When the vehicle 10 is steered through a turn, the outboard wheel operates at a higher speed than the inboard wheel. The controller 54 controls operation of the differential shaft 60, as further described below, to allow the outboard wheel to turn at the higher rotational speed to travel a greater distance than the inboard wheel in the same amount of time. Since the outboard wheel must accelerate relative to the inner wheel, it requires more torque and through operation of the differential shaft 60, the electric machine 34 delivers more torque to the outboard wheel so that it will spin faster.

Altering the differential action to enhance traction with the ground is achieved by locking the differential shaft 60 as further described below. For example, a steering angle sensor (not shown) on the vehicle 10, and algorithms in the controller 54 that use a defined angle limit, may operate to automatically lock (or unlock) the differential shaft 60. This functioning may alternatively be provided through a manual switch operated by the vehicle operator when enhanced traction is desired. In some examples, braking of the wheels 14, 32 may be provided through use of the electric machine 34 as a generator with storage of the energy in the battery system 24. In other examples, this may be accomplished through the use of a brake resistor (not shown).

Figure 3:
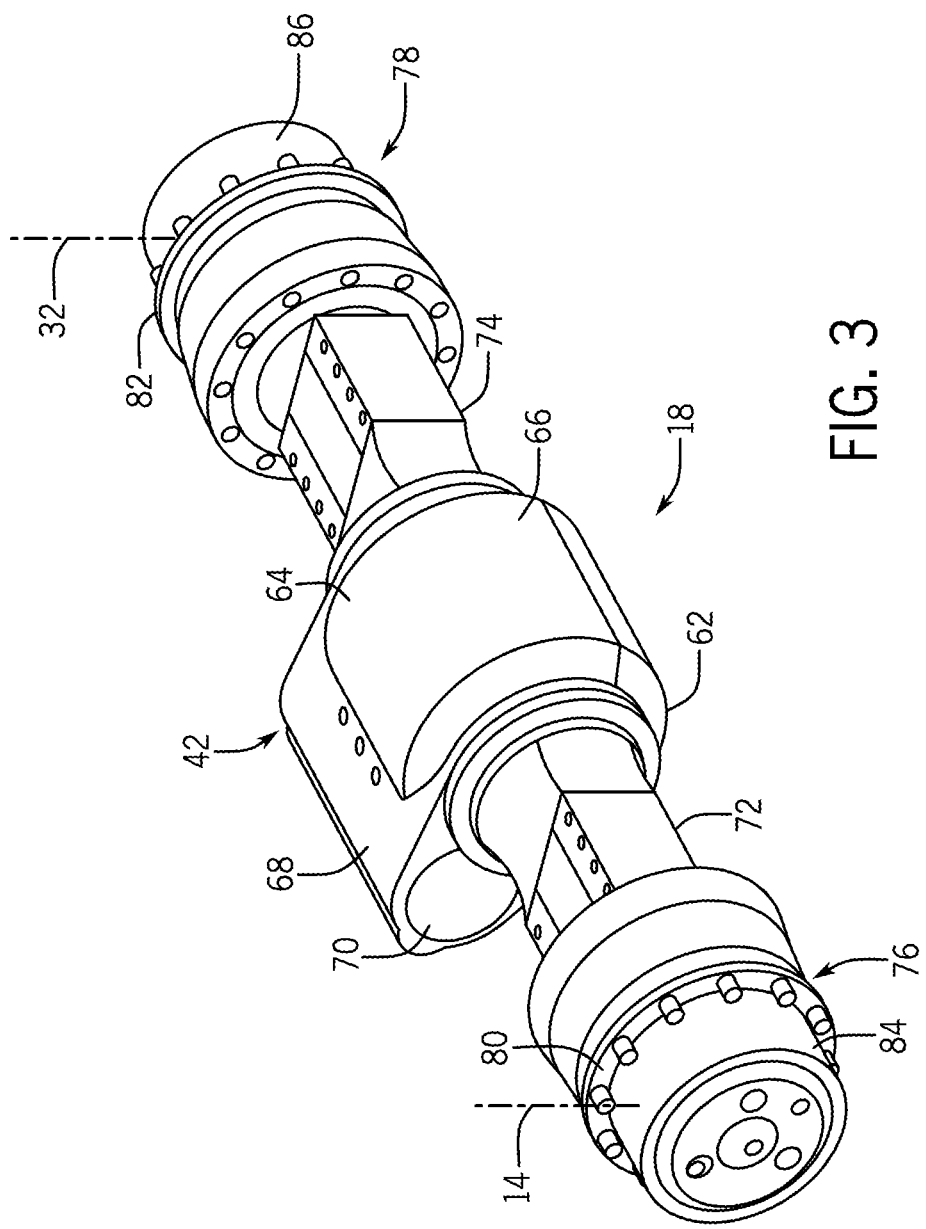
FIG. 3 is an isometric view of an example axle assembly of the electric drive axle system according to this disclosure.

Referring to FIG. 3, the axle assembly 18 is shown in isolation for visibility of its packaging features. The center housing 42 is constructed with a lower housing 62 and an upper housing 64 that are fastened together and that are configured to contain the electric machine 34, the gearsets 38, 40 and the differential shaft 60. The center housing 42 includes a cylindrical section 66 that houses the electric machine 34 and the gearsets 38, 40, and includes an integral cylindrical section 68 that houses the differential shaft 60. The cylindrical section 68 includes a circular retainer 70 that is removeable and is maintained in position by screws. A pair of axle housings 72, 74 are fastened to the center housing 42 and are configured to contain the output shafts 44, 46. The axle housings 72, 74 are constructed with flat surfaces and bolt holes for connection with mating features on the chassis 12 of the vehicle 10. Hub assemblies 76, 78 are fastened to the axle housings 72, 74, respectively. The hub assemblies 76, 78 are configured to connect with the wheels 14, 32, respectively, at flanges 80, 82. In the current example, the hub assemblies 76, 78 include final drive gearsets 84, 86 that are disposed within the centers of the wheels 14, 32. Also in this example, mechanical wet friction brakes 88, 90 are disposed at the inboard sides of the final drive gearsets 84, 86, respectively. Packaging the electric machine 34, the gearsets 38, 40 and the differential shaft 60 in the center housing 42 and the final drive gearsets 84, 86 in the wheels 14, 32 provides an efficient package for the electric drive axle system 30. The axle assembly 18 may be used at one or more of the axle locations on a given vehicle, depending on the number of drive wheels involved.

Figure 4:
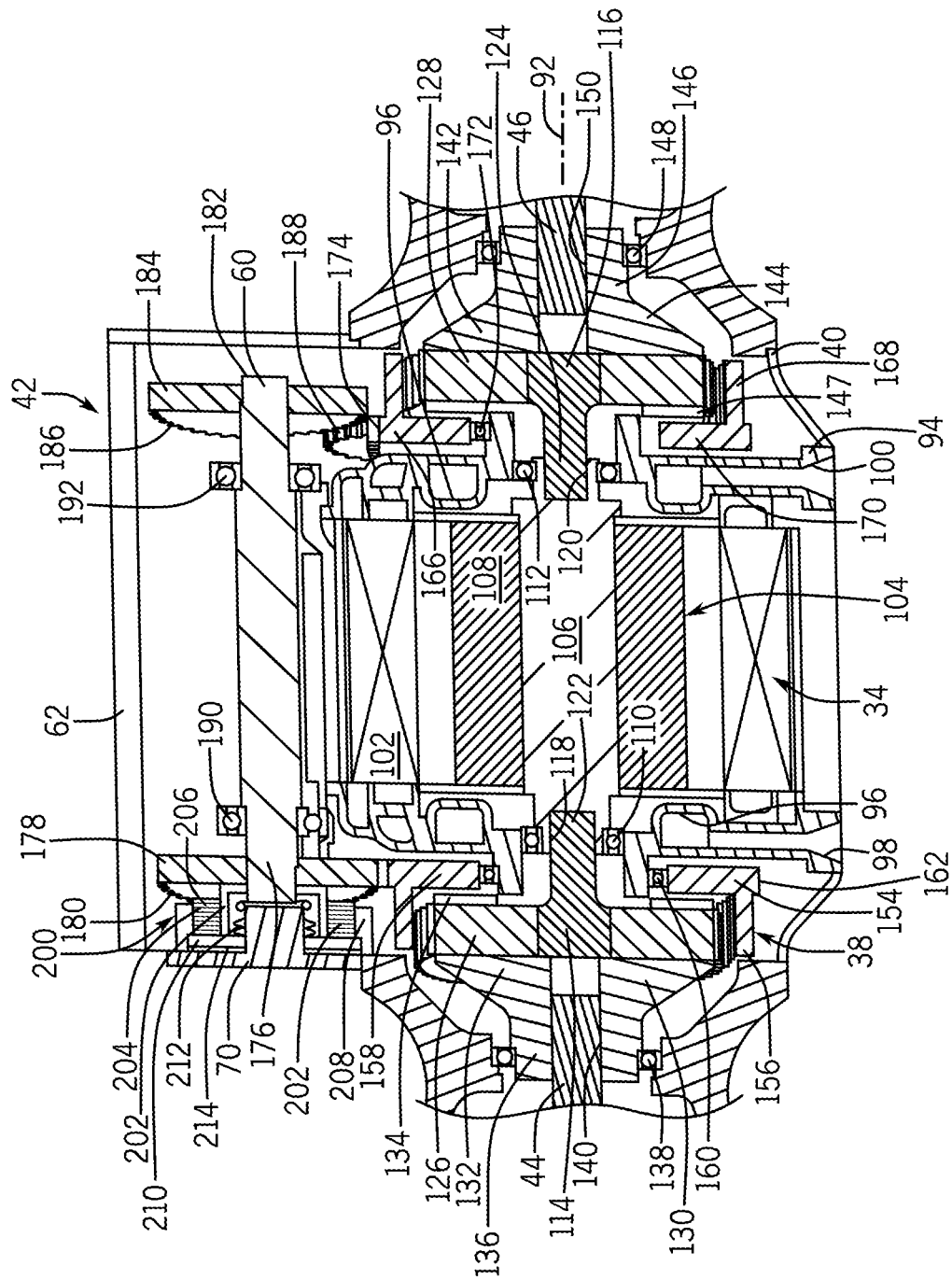
FIG. 4 is a fragmentary, perspective, cross-sectional illustration of the drive assembly area of an electric drive axle system according to one embodiment of the disclosed system.

Referring to FIG. 4, the center housing 42 is shown with its upper housing 64 removed to show the internal components, which are illustrated in section generally through the axle center 92 with the lower housing 62 visible in the background. Generally, the electric machine 34, the gearsets 38, 40 and the differential shaft 60 are included. The electric machine 34 includes a motor housing 94 with cooling channels 96 connected with ports 98, 100 to provide liquid cooling of the electric machine 34. The electric machine 34 may be a DC electric machine or an AC electric machine. In the current example, the motor housing 94 contains a stator 102 surrounding a rotor 104. The rotor 104 includes a shaft 106 and magnetic elements 108. In this example the shaft 106 is supported on bearings 110, 112 contained in the motor housing 94, and is fit with sun gears 114, 116 of the gears sets 38, 40, respectively. The shaft 106 includes receiver type openings 118, 120 that fixedly receive shafts 122, 124 of the sun gears 114, 116, respectively. As a result, the rotor 104 rotates as a unit with the sun gears 114, 116. In other examples, the sun gears 114, 116 may be formed from one piece with the shaft 106.

Within the center housing 42, the gearset 38 includes a number of planet gears 126 meshing with the sun gear 114, and the gear set 40 includes a number of planet gears 128 meshing with the sun gear 116. In the current example, each gearset 38, 40 includes three planet gears 126, 128, respectively, to distribute loads around the sun gears 114, 116. In other examples, another number may be used. The planet gears 126 are supported on a carrier 130 that includes a conically shaped section 132 with studs 134 on which the planet gears 126 rotate. Outboard from the section 132, the carrier 130 includes a cylindrically shaped section 136 supported on the center housing 42 by a bearing 138. The carrier 130 has an opening 140 that extends along the axle center 92, and is splined to receive a mating splined section of the output shaft 44. Similarly, the planet gears 128 are supported on a carrier 142 that includes a conically shaped section 144 with studs 147 on which the planet gears 128 rotate. Outboard from the section 144, the carrier 142 includes a cylindrically shaped section 146 supported on the center housing 42 by a bearing 148. The carrier 142 has an opening 150 that extends along the axle center 92, and is splined to receive a mating splined section of the output shaft 46.

The gearset 38 includes a ring gear 154 that has a cylindrical section 156 that extends over the planet gears 126 and has internal teeth meshing with the planet gears 126. The ring gear 154 also has a radially extending disc shaped section 158, integral with the section 156. The section 158 includes a circular opening containing a bearing 160 to support the ring gear 154 on the motor housing 94. The section 158 also has external teeth 162 facing radially outward away from the axle center 92. Similarly, the gearset 40 includes a ring gear 166 that has a cylindrical section 168 that extends over the planet gears 128 and has internal teeth meshing with the planet gears 128. The ring gear 166 also has a radially extending disc shaped section 170 integral with the section 168. The section 170 has a circular opening containing a bearing 172 to support the ring gear 166 on the motor housing 94. The section 170 also has external teeth 174 facing radially outward away from the axle center 92.

The differential shaft 60 spans the length of the rotor 104 and has an end 176 on which a differential gear 178 is fixed. The differential gear 178 is disposed in line with the section 158 of the ring gear 154 along the direction of the axle center 92. Teeth 180 of the differential gear 178 mesh with the external teeth 162 so that the ring gear 154 will rotate only when the differential gear 178 rotates. Opposite the end 176, the differential shaft 60 has an end 182 on which another differential gear 184 is fixed. The differential gear 184 has teeth 186 and is disposed out of line with the section 170 of the ring gear 166 so that the teeth 186 do not mesh directly with the external teeth 174. Instead, the differential gear 184 meshes with an idler gear 188, which also meshes with the external teeth 174 so that the ring gear 166 will rotate only when the differential gear 184 and the idler gear 188 rotate. The differential shaft 60 is supported on the center housing 42 by bearings 190, 192 enabling its rotation.

Rotation of the differential shaft 60 is controlled by the controller 54 through a clutch 200 contained in the center housing 42 inside the opening closed by the retainer 70. The clutch 200 includes an inner hub 202 to which a set of inner plates 204 are keyed, and which is fixed to the differential shaft 60 and/or the differential gear 178 to rotate therewith. A set of outer plates 206 are interleaved with the inner plates 204 and are keyed to an insert 208 fixed in the center housing 42. Accordingly, the outer plates 206 are held by the center housing 42 and do not rotate. A piston 210 is disposed adjacent the stacked inner and outer plates 204, 206 and is forced toward the retainer 70 by a return spring 212 which urges the plates 204, 206 to separate, to normally place the clutch 200 in a disengaged state. To engage the clutch 200, fluid pressure is introduced into a chamber 214 between the retainer 70 and the piston 210 compressing the return spring 212 and the stack of plates 204, 206 locking the plates 204, 206 together under friction. Disengaging the clutch 200 allows rotation of the differential shaft 60, and engaging the clutch 200 prevents rotation of the shaft 60. In other examples, the clutch 200 may be a mechanical lug or dog style clutch to selectively lock the differential shaft 60. In other examples, an electromagnetic clutch may be used. In some examples, a second clutching mechanism may be added at the end 182 of the differential shaft 60 for added differential locking capacity.

Figure 5:
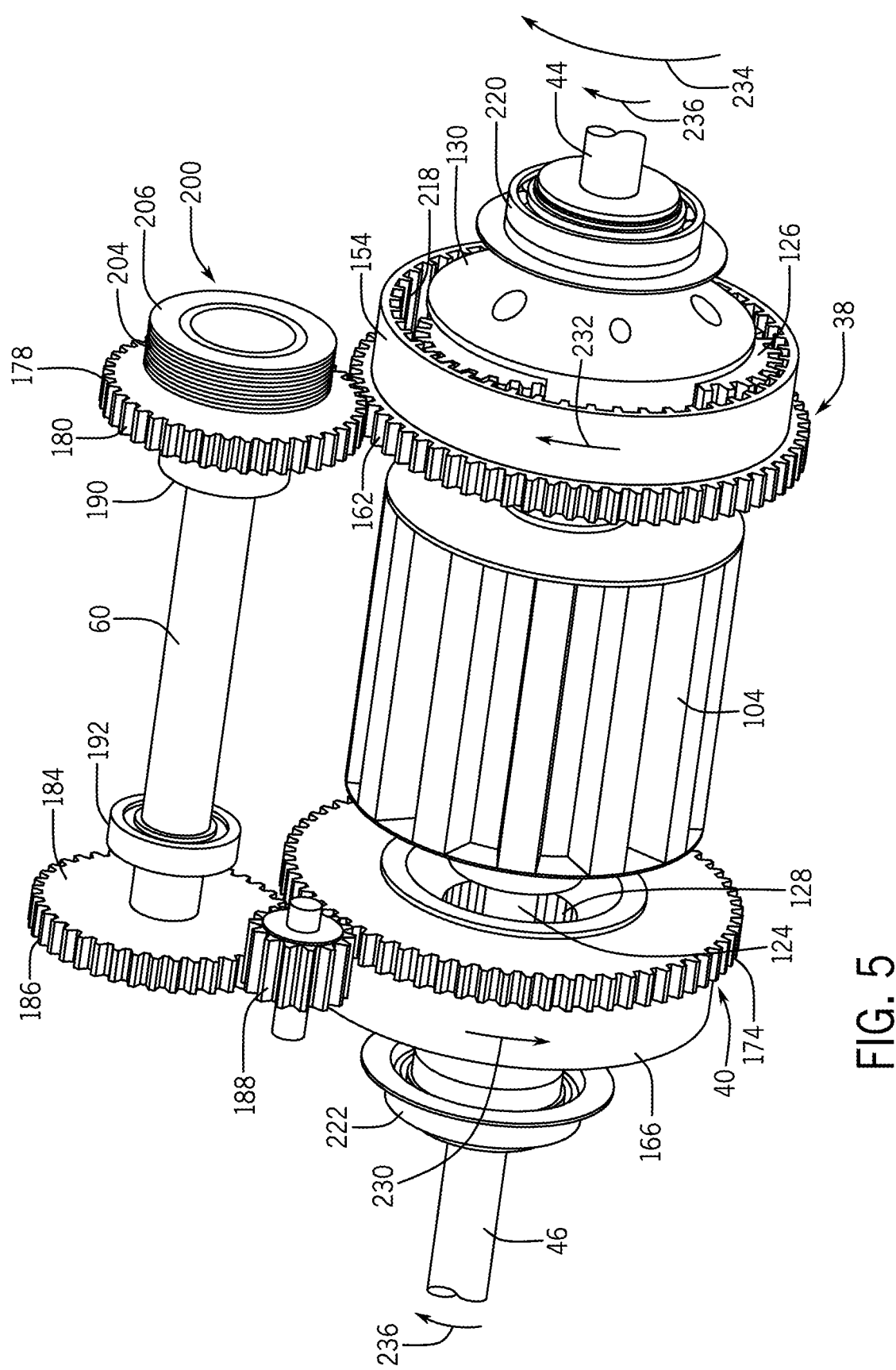
FIG. 5 is a fragmentary, isometric illustration of the motor area of the drive assembly of FIG. 4, with housing elements removed.

Referring additionally to FIG. 5, select internal components are shown with the center housing 42 removed for visibility. The internal teeth 218 of the ring gear 154 are visible meshing with the planet gears 126. In FIG. 5, the output shafts 44, 46 are shown surrounded with respective seal and bearing assemblies 220, 222, which seal against, and provide support on, the axle housings 72, 74 (shown in FIG. 3). Accordingly, the internal components within the center hosing 42 may be immersed in lubricant.

When the clutch 200 is engaged so that the plates 204, 206 are locked together, the differential shaft 60 is locked to the center housing 42. This prevents rotation of the differential gears 178, 184, the idler gear 188 and the ring gears 154, 166. Operation of the electric machine 34 to rotate the rotor 104 translates to rotation of the sun gears 114, 116 at the same speed. The sun gears 114, 116 are similar, as are the planet gears 126, 128 and the carriers 130, 142. Accordingly, controlled operation of the electric machine 34 results in rotation of the carriers 130, 142 and the connected output shafts 44, 46 at a common speed that may be varied with operation of the electric machine 34. As a result, the wheels 14, 32 rotate at a common speed when the clutch 200 is engaged. This mode supports operation of the vehicle 10 in a straight direction, either forward or reverse. The controller 54 controls the electric machine 34 to provide the required amount of speed and torque. With input to the gearsets 38, 40 delivered at the sun gears 114, 116, output provided at the carriers 130, 142 and the ring gears 154, 166 held, the maximum reduction ratio and the maximum torque increase obtainable from the gearsets 38, 40 is achieved. As noted above, in addition to straight line travel, engagement of the clutch 200, either automatically or manually, may be effected when desired differential lock function for traction or other purposes.

When the clutch 200 is disengaged, the differential shaft 60 is allowed to rotate. This allows the differential gears 178, 184, the idler gear 188 and the ring gears 154, 166 to rotate. As noted above, disengagement of the clutch 200 allows for rotation of the wheels 14, 32 at different speeds such as when the vehicle 10 is navigating through a turn. Because the ring gears 154, 166 are engaged with each other through the differential shaft 60, their rotation is not free but is constrained by the torque passing through each side of the axle assembly 18. As a result, torque is delivered to the wheels 14, 32 even though all components of the gearsets 38, 40 can rotate.

Positioning of the idler gear 188 between the differential gear 184 and the ring gear 166 means that the ring gear 166 will rotate in a direction 230 (for example), that is opposite the direction 232 at which the ring gear 154 rotates. The idler gear 188, as an intermediate gear, does not change the gear ratio between the differential gear 184 and the ring gear 166 as compared to that of the commonly sized differential gear 178 and the ring gear 154. As an example of operation in a turn, a direction of travel 234 is as indicated in FIG. 5 and represents a right turn. In this example, the output shaft 46 is on the outside of the turn and the output shaft 44 is on the inside of the turn. This means that the output shaft 46 is required to rotate faster than the output shaft 44 for the wheels 14, 32 to roll without slip and to propel the vehicle 10 in the same general direction of travel 234. It should be noted that the inputs to the gearsets 38, 40 via the sun gears 114, 116 as driven by the rotor 104, will be at the same speed. Accelerating the carrier 142 on the outside of the turn requires increasing the rate at which the planet gears 128 orbit the sun gear 116 as compared to the speed at which the planet gears 126 on the inside of the turn orbit the sun gear 114. When a given ring gear rotates in the same direction as the sun gear, though at a slower speed, the rotation of the planet gears will slow. Conversely, when a ring gear rotates in the opposite direction as the sun gear, the rotation of the planet gears will increase in speed. Accordingly, in this example, the output shafts 44, 46 rotate in a common direction 236 to drive the wheels 14, 32, but the output shaft 46 rotates faster with the ring gear 166 rotating in an opposite direction as the sun gear 116 and the ring gear 154 rotating in the same direction as the sun gear 114. In this example, the ring gear 166 rotates in the direction 230, which is opposite the direction 236, and the ring gear 154 rotates in the direction 232, which is the same as the direction 236. When the output shaft 44 is on the outside of a turn, the opposite would be the case.

Through the examples described above, an electric drive axle system uses a single, integral electric machine packaged inside an axle house to provide drive torque for two wheels. The electric machine is coupled with output shafts for driving the two wheels, and is configured with integrated transmission and differential mechanisms to support operation with different wheel speeds and with torque lock.

Also, the following examples are provided, which are numbered for easier reference:

1. An axle system comprising: a first output shaft; a second output shaft; a motor having a rotor shaft disposed in line with the first and second output shafts; a first planetary gearset coupled between the rotor shaft and the first output shaft and having a first sun gear meshing with a first set of planet gears supported on a first carrier; and a second planetary gearset coupled between the rotor shaft and the second output shaft and having a second sun gear meshing with a second set of planet gears supported on a second carrier; wherein the rotor shaft is fixed to the first and second sun gears, the first output shaft is fixed to the first carrier, and the second output shaft is fixed to the second carrier.

2. The system of example 1, further comprising: a first ring gear disposed around and engaging the first set of planet gears; a second ring gear disposed around and engaging the second set of planetary gears; and a clutch configured to alternately engage to fix the ring gears from turning or to disengage to release the ring gears to turn.

3. The system of example 2, further comprising: an idler gear meshing with the first ring gear; a first differential gear meshing with the idler gear; a second differential gear meshing with the second ring gear; and a differential shaft fixed to the first and second differential gears; wherein the clutch is connected with the differential shaft.

4. The system of example 3, further comprising a case housing the clutch, wherein the clutch, when engaged, is configured to connect the differential shaft to the case to prevent the differential shaft from turning.

5. The system of example 4, wherein the clutch comprises a multi-plate clutch with a first set of clutch plates rotationally fixed with the case and a second set of clutch plates interleaved with the first set of clutch plates and rotationally fixed with the differential shaft.

6. The system of example 3, wherein the clutch, when engaged, is configured to prevent the first and second differential gears from turning so that the output shafts are required to rotate at a common speed.

7. The system of example 2 comprising: a first wheel driven by the first output shaft; and a second wheel driven by the second output shaft; wherein the first and second wheels are configured to rotate at the same speed when the clutch is engaged.

8. The system of example 7, wherein the first and second wheels are configured to rotate at different speeds when the clutch is disengaged.

9. The system of example 2, further comprising a controller configured to disengage the clutch when the axle is operated in a turn, and configured to engage the clutch when the axle is operated in a straight track.

10. The system of example 9, further comprising: a first wheel driven by the first output shaft; and a second wheel driven by the second output shaft; wherein the controller is configured to engage the clutch to generate traction from both the first and second wheels.

11. An axle system comprising: a first output shaft configured to drive a first wheel; a second output shaft configured to drive a second wheel; a motor configured to drive the first and second output shafts; a first planetary gearset coupled between the rotor shaft and the first output shaft and having a first sun gear meshing with a first set of planet gears supported on a first carrier; and a second planetary gearset coupled between the rotor shaft and the second output shaft and having a second sun gear meshing with a second set of planet gears supported on a second carrier; wherein the rotor shaft is connected with the first and second sun gears, the first output shaft is connected with the first carrier and the second output shaft is connected with the second carrier.

12. The system of example 11, further comprising: a first ring gear disposed around and engaging the first set of planet gears; a second ring gear disposed around and engaging the second set of planetary gears; and a clutch configured to alternately engage to prevent the ring gears from turning or to disengage to release the first and second ring gears to turn.

13. The system of example 12, further comprising: an idler gear meshing with the first ring gear; a first differential gear meshing with the idler gear; a second differential gear meshing with the second ring gear; and a differential shaft fixed to the first and second differential gears; wherein the clutch is connected with the differential shaft.

14. The system of example 13, further comprising a case housing the clutch, wherein the clutch, when engaged, is configured to connect the differential shaft to the case.

15. The system of example 14, wherein the clutch comprises a multi-plate clutch with a first set of clutch plates rotationally fixed with the case and a second set of clutch plates interleaved with the first set of clutch plates and rotationally fixed with the differential shaft.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:
1. An axle system comprising:
a first output shaft;
a second output shaft;
a motor having a rotor shaft disposed in line with the first and second output shafts;
a first planetary gearset coupled between the rotor shaft and the first output shaft and having a first sun gear meshing with a first set of planet gears supported on a first carrier and a first ring gear disposed around and engaging the first set of planet gears, the first ring gear having external teeth and internal teeth;
a second planetary gearset coupled between the rotor shaft and the second output shaft and having a second sun gear meshing with a second set of planet gears supported on a second carrier and a second ring gear disposed around and engaging the second set of planetary gears;
a clutch configured alternately to engage to fix the first and second ring gears from turning or to disengage to release the first and second ring gears;
an idler gear meshing with the external teeth of the first ring gear for reversing a rotation direction of the first ring gear when the clutch is disengaged;
a first differential gear meshing with the idler gear;
a second differential gear meshing with the second ring gear; and
a differential shaft mounting the first and second differential gears, wherein the clutch is connected with the differential shaft;

wherein the rotor shaft is fixed to the first and second sun gears, the first output shaft is fixed to the first carrier, and the second output shaft is fixed to the second carrier; and wherein the first differential gear is commonly sized with the second differential gear and the first ring gear is commonly sized with the second ring gear.

2. The system of claim 1, further comprising a case housing the clutch;

wherein the clutch, when engaged, is configured to connect the differential shaft to the case to prevent the differential shaft from turning.

3. The system of claim 2, wherein the clutch comprises a multi-plate clutch with a first set of clutch plates rotationally fixed with the case and a second set of clutch plates interleaved with the first set of clutch plates and rotationally fixed with the differential shaft.

4. The system of claim 1, wherein the clutch, when engaged, is configured to prevent the first and second differential gears from turning so that the first and second output shafts are required to rotate at a common speed.

5. The system of claim 1, comprising:
a first wheel driven by the first output shaft; and
a second wheel driven by the second output shaft;
wherein the first and second wheels are configured to rotate at the same speed when the clutch is engaged.

6. The system of claim 5, wherein the first and second wheels are configured to rotate at different speeds when the clutch is disengaged.

7. The system of claim 1, further comprising a controller configured to disengage the clutch when the axle is operated in a turn, and configured to engage the clutch when the axle is operated in a straight track.

8. The system of claim 7, further comprising:
a first wheel driven by the first output shaft; and
a second wheel driven by the second output shaft;
wherein the controller is configured to engage the clutch to generate traction from both the first and second wheels.

9. The system of claim 1, wherein the first differential gear has teeth that are axially offset from the external teeth of the first ring gear.

10. The system of claim 1, wherein the idler gear has an axial length that is greater than an axial length of the first differential gear and is greater than an axial length of the external teeth of the first ring gear.

11. An axle system comprising:
a first output shaft configured to drive a first wheel;
a second output shaft configured to drive a second wheel;
a motor having a rotor shaft, the motor configured to drive the first and second output shafts;
a first planetary gearset coupled between the rotor shaft and the first output shaft and having a first sun gear meshing with a first set of planet gears supported on a first carrier and a first ring gear disposed around and engaging the first set of planet gears;
a second planetary gearset coupled between the rotor shaft and the second output shaft and having a second sun gear meshing with a second set of planet gears supported on a second carrier and a second ring gear disposed around and engaging the second set of planetary gears;
an idler gear meshing with the first ring gear;
a first differential gear meshing with the idler gear;
a second differential gear meshing with the second ring gear;
a differential shaft fixed to the first and second differential gears; and
a clutch connected with the differential shaft, the clutch configured alternately to engage to prevent the first and second ring gears from turning or to disengage to release the first and second ring gears;
wherein the rotor shaft is directly connected with the first and second sun gears, the first output shaft is connected with the first carrier and the second output shaft is connected with the second carrier;
wherein a gear tooth ratio of the first differential gear to the first ring gear is equal to a gear tooth ratio of the second differential gear to the second ring gear.

12. The system of claim 11, further comprising a case housing the clutch, wherein the clutch, when engaged, is configured to connect the differential shaft to the case.

13. The system of claim 12, wherein the clutch comprises a multi-plate clutch with a first set of clutch plates rotationally fixed with the case and a second set of clutch plates interleaved with the first set of clutch plates and rotationally fixed with the differential shaft.

14. The system of claim 11, wherein the clutch, when engaged, is configured to prevent the first and second differential gears from turning.

15. The system of claim 11, wherein the first and second wheels are configured to rotate at the same speed when the clutch is engaged.

16. The system of claim 15, wherein the first and second wheels are configured to rotate at different speeds when the clutch is disengaged.

17. The system of claim 11, further comprising a controller configured to disengage the clutch when the axle is operated in a turn, and configured to engage the clutch when the axle is operated in a straight track.

18. An axle system comprising:
a first output shaft configured to drive a first wheel;
a second output shaft configured to drive a second wheel;
a motor having a rotor shaft disposed in line with the first and second output shafts, the motor configured to drive the first and second output shafts;
a first planetary gearset coupled between the rotor shaft and the first output shaft and having a first sun gear meshing with a first set of planet gears supported on a first carrier and meshing with a first ring gear; and
a second planetary gearset coupled between the rotor shaft and the second output shaft and having a second sun gear meshing with a second set of planet gears supported on a second carrier and meshing with a second ring gear, wherein the rotor shaft is fixed directly to the first and second sun gears, the first output shaft is fixed to the first carrier and the second output shaft is fixed to the second carrier;
an idler gear meshing with the first ring gear;
a first differential gear meshing with the idler gear;
a second differential gear meshing with the second ring gear;
a differential shaft fixed to the first and second differential gears; and
a clutch connected with the differential shaft, the clutch configured to alternately engage to prevent the first and second ring gears from turning requiring the first and second wheels to rotate at a common speed, or to disengage to release the first and second ring gears to turn, enabling the first and second wheels to rotate relative to one another;

wherein the first differential gear and the first ring gear are commonly sized with the second differential gear and the second ring gear, respectively.

\* \* \* \* \*